United States Patent
Rossi et al.

(10) Patent No.: US 11,703,119 B2
(45) Date of Patent: Jul. 18, 2023

(54) CONTROL METHOD FOR CONSTANT SPEED RUNNING OF VEHICLE AND CONTROL DEVICE FOR CONSTANT SPEED RUNNING OF VEHICLE

(71) Applicant: NISSAN MOTOR CO., LTD., Yokohama (JP)

(72) Inventors: Sergio Rossi, Kanagawa (JP); Michiharu Gunji, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 17/640,460

(22) PCT Filed: Sep. 5, 2019

(86) PCT No.: PCT/JP2019/034994
§ 371 (c)(1),
(2) Date: Mar. 4, 2022

(87) PCT Pub. No.: WO2021/044582
PCT Pub. Date: Mar. 11, 2021

(65) Prior Publication Data
US 2022/0299106 A1    Sep. 22, 2022

(51) Int. Cl.
*F16H 61/02*  (2006.01)
*F16H 59/44*  (2006.01)
(Continued)

(52) U.S. Cl.
CPC ......... *F16H 61/0213* (2013.01); *F16H 59/44* (2013.01); *F16H 59/48* (2013.01); *F16H 59/70* (2013.01); *F16H 2059/706* (2013.01)

(58) Field of Classification Search
CPC .......... F16H 59/44; F16H 59/48; F16H 59/70; F16H 2059/704; F16H 2059/706; F16H 61/0213; F16H 2061/0234
See application file for complete search history.

(56) References Cited

U.S. PATENT DOCUMENTS 5,913,916 A * 6/1999 Bai ................. F16H 61/143
  706/900
2009/0171540 A1* 7/2009 Sugiura ............ F16H 61/21
  701/52

(Continued)

FOREIGN PATENT DOCUMENTS

JP   2-274635 A   11/1990

*Primary Examiner* — Edwin A Young
(74) *Attorney, Agent, or Firm* — Foley & Lardner LLP

(57) ABSTRACT

The control method for a constant speed running of a vehicle performs a vehicle speed control for downshifting the gear position of the automatic transmission when the acceleration/deceleration of the vehicle is larger than the determination value during the constant speed running control. In the control method, the automatic transmission includes a plurality of gear positions that can be downshifted during the constant speed running control, and among the plurality of gear positions, the determination value between the gear positions having a relatively large difference in the gear ratio between the gear positions is set to be larger than the determination value between the gear positions having a relatively small difference in the gear ratio between the gear positions.

5 Claims, 6 Drawing Sheets

(51) Int. Cl.
 *F16H 59/48* (2006.01)
 *F16H 59/70* (2006.01)

(56) References Cited

U.S. PATENT DOCUMENTS

2010/0168946 A1\* 7/2010 Snyder .................... H02P 6/182
 701/22
2019/0128418 A1\* 5/2019 Ueda ....................... F02D 37/02

\* cited by examiner

CONTROL METHOD FOR CONSTANT SPEED RUNNING OF VEHICLE AND CONTROL DEVICE FOR CONSTANT SPEED RUNNING OF VEHICLE

TECHNICAL FIELD

The present invention relates to a control method for a constant speed running of a vehicle and a control device for a constant speed running of a vehicle.

BACKGROUND ART

JP H2-274635 A discloses a control having a resume function for performing constant speed running at a target vehicle speed which has been set during previous constant speed running. In this control, when returning to the constant speed running by the resume function, if it is determined that a vehicle speed deviation obtained by subtracting an actual vehicle speed from the target vehicle speed is large and it is further determined by an acceleration determination unit that the vehicle is in an acceleration state, a gear ratio is shifted down to a predetermined gear ratio.

SUMMARY OF INVENTION

During a constant speed running control, a vehicle speed can be converged to a target vehicle speed of the constant speed running control by switching gear positions of an automatic transmission in accordance with an acceleration/deceleration of the vehicle. For example, while the vehicle is running downhill, the vehicle to be accelerated can be decelerated by performing a downshift in accordance with the acceleration, whereby the vehicle speed can be converged to the target vehicle speed.

However, when a difference in the gear ratio between two gear positions before and after the downshift is large, the vehicle is suddenly decelerated. As a result, an upshift is performed in accordance with the deceleration, and at this time, the upshift is performed in a short time following the downshift. That is, a busy shift occurs.

The present invention has been made in view of such a problem, and an object of the present invention is to suppress a busy shift during a constant speed running control.

A control method for a constant speed running of a vehicle according to a certain aspect of the present invention performs a vehicle speed control by downshifting a gear position of an automatic transmission in a case where an acceleration/deceleration of the vehicle is larger than a determination value during a constant speed running control. The automatic transmission includes a plurality of gear positions that is capable of being downshifted during the constant speed running control, and among the plurality of gear positions, a determination value between gear positions having a relatively large difference in a gear ratio between the gear positions is set to be larger than a determination value between gear positions having a relatively small difference in the gear ratio between the gear positions.

According to another aspect of the present invention, a control device for a constant speed running of a vehicle corresponding to the control method for the constant speed running of the vehicle mentioned above is provided.

DESCRIPTION OF EMBODIMENTS

Hereinafter, embodiments of the present invention will be described with reference to the accompanying drawings.

Figure 1:
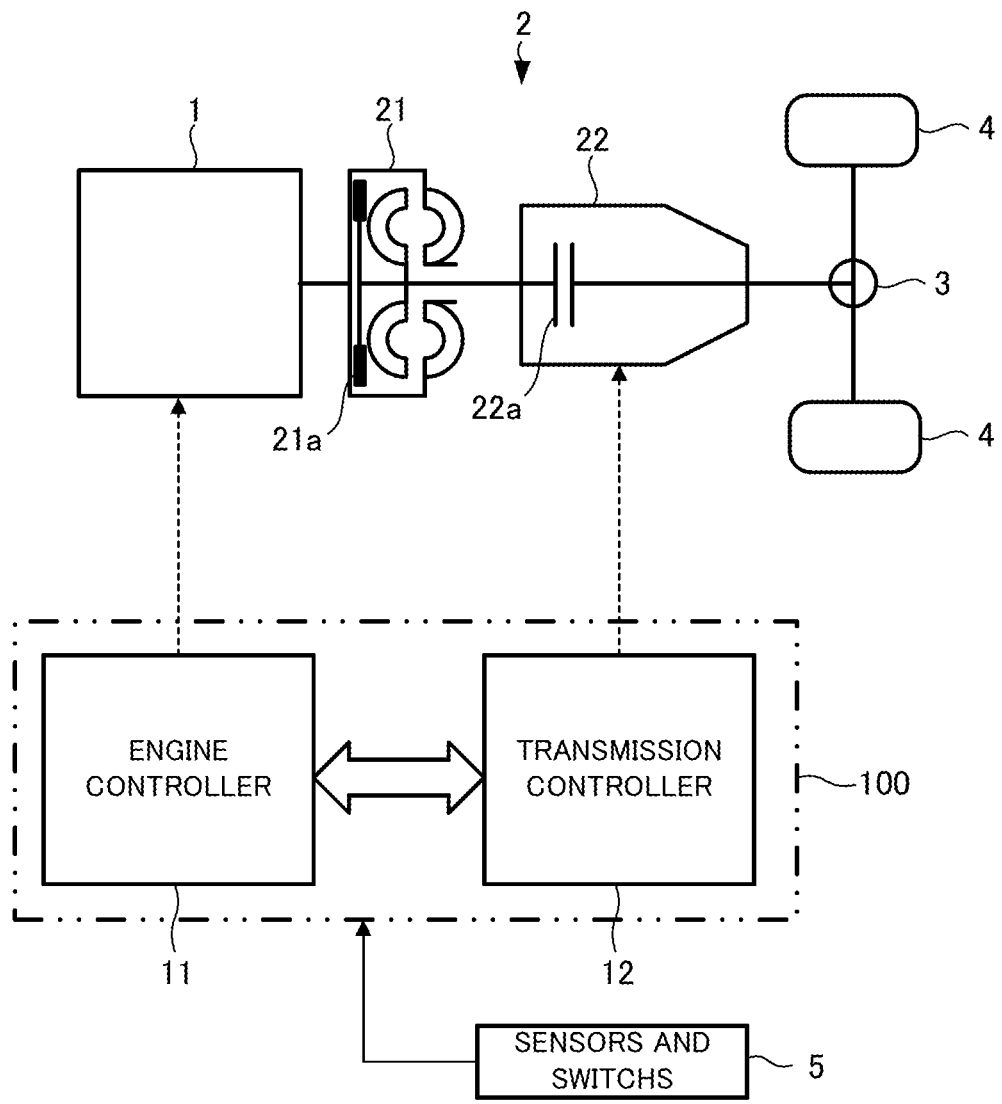
FIG. 1 is a schematic configuration diagram of a vehicle.

FIG. 1 is a schematic configuration diagram of a vehicle. The vehicle includes an internal combustion engine 1, an automatic transmission 2, a differential gear 3, and driving wheels 4. The internal combustion engine 1 is a driving source, and power of the internal combustion engine 1 is transmitted to the driving wheels 4 via the automatic transmission 2 and the differential gear 3. Therefore, the automatic transmission 2 is provided in a power transmission path connecting the internal combustion engine 1 and the driving wheels 4.

The automatic transmission 2 is a stepped automatic transmission that performs gear shift by changing the gear ratio in a stepwise manner, and outputs input rotation at rotation corresponding to the gear ratio. The gear ratio is a value obtained by dividing the input rotation by the output rotation. An output shaft of the automatic transmission 2 is connected to the driving wheels 4 via the differential gear 3.

The automatic transmission 2 includes a torque converter 21 and an automatic transmission mechanism 22. The torque converter 21 transmits power via a fluid. In the torque converter 21, a power transmission efficiency is improved by engaging a lock-up clutch 21a. The automatic transmission mechanism 22 includes a clutch 22a. The clutch 22a is constituted by a shift friction element to be engaged at a current gear position GP among the shift friction elements in the automatic transmission mechanism 22.

The vehicle further includes an engine controller 11 and a transmission controller 12. The engine controller 11 controls the internal combustion engine 1, and the transmission controller 12 controls the automatic transmission 2. The engine controller 11 and the transmission controller 12 are connected to each other such that communication is possible between the engine controller 11 and the transmission controller 12. The engine controller 11 and the transmission controller 12 may be connected to each other such that communication is possible between the engine controller 11 and the transmission controller 12 via, for example, an integrated controller that performs an integrated control of a plurality of controllers.

The engine controller 11 and the transmission controller 12 constitute a controller 100 for performing the constant speed running control. The constant speed running control is also referred to as an auto-cruise control, and includes a vehicle speed convergence control described below.

The vehicle speed convergence control is a vehicle speed control in which a vehicle speed VSP is controlled by switching the gear position GP of the automatic transmission 2 in accordance with an acceleration/deceleration G of the vehicle, and the vehicle speed VSP is converged to a target vehicle speed VSP_T by the vehicle speed convergence control.

The vehicle speed convergence control is started when the vehicle speed VSP reaches a start vehicle speed VSP1 of the vehicle speed convergence control, and the vehicle speed VSP is controlled to converge to the target vehicle speed VSP_T.

The controller 100 receives signals from sensors and switches 5 including a vehicle speed sensor for detecting the vehicle speed VSP, an acceleration sensor for detecting the acceleration/deceleration G of the vehicle, an accelerator position sensor for detecting an accelerator position APO, a towing detection sensor for detecting a towing state of the vehicle, an operation switch for the constant speed running control and the like.

Figure 2:
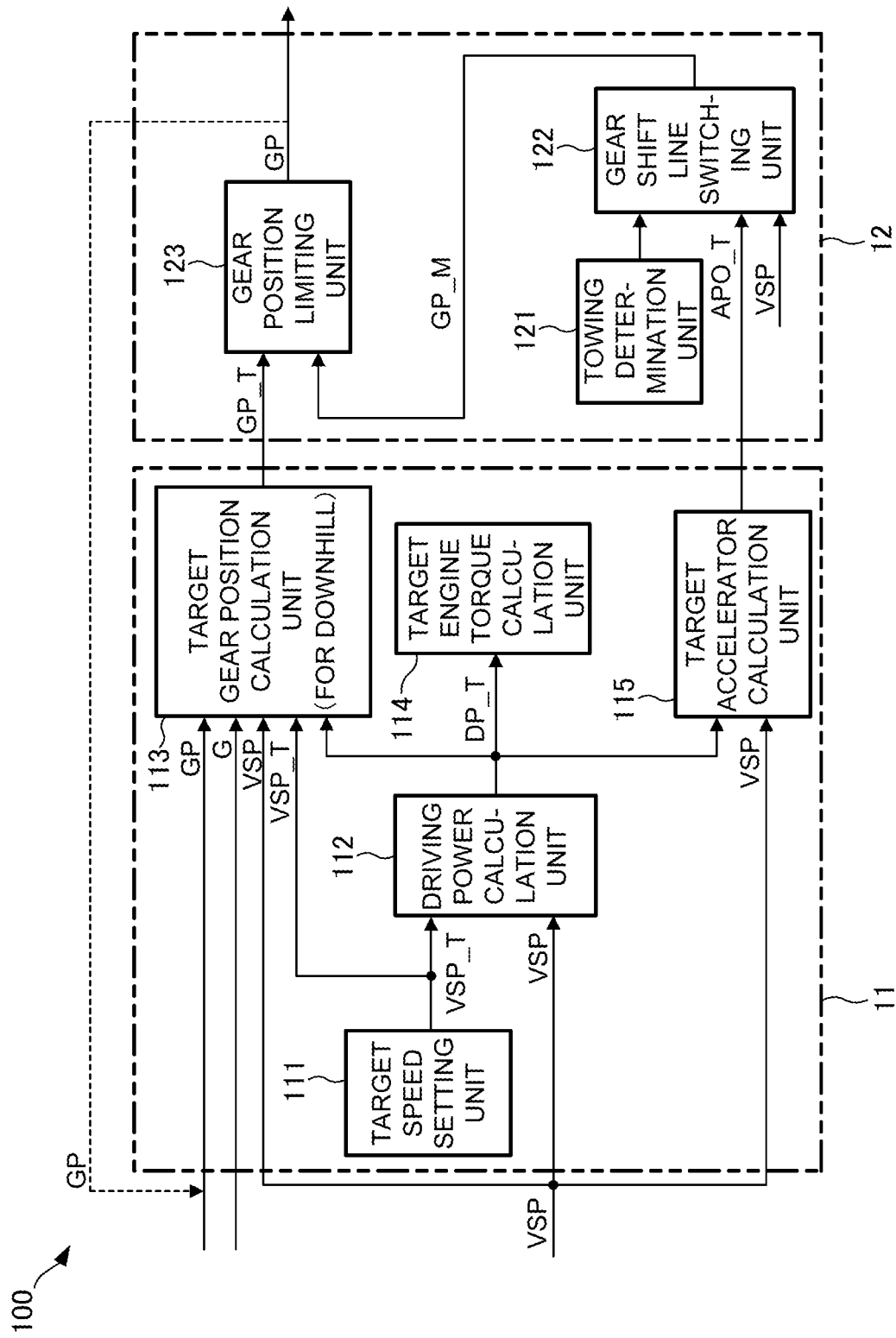
FIG. 2 is a functional block diagram of a controller.

FIG. 2 is a functional block diagram of the controller 100. The engine controller 11 includes a target vehicle speed setting unit 111, a target driving power calculation unit 112, a target gear position calculation unit 113, a target engine torque calculation unit 114, and a target accelerator position calculation unit 115. The transmission controller 12 includes a towing determination unit 121, a gear shift line switching unit 122, and a gear position limiting unit 123. With the engine controller 11 and the transmission controller 12, these configurations are functionally implemented.

The target vehicle speed setting unit 111 sets the target vehicle speed VSP_T. The target vehicle speed VSP_T is a target vehicle speed of the constant speed running control, and is set in accordance with an operation state of an operation switch of the constant speed running control or the like.

The set target vehicle speed VSP_T is input to the target driving power calculation unit 112 and the target gear position calculation unit 113.

The target driving power calculation unit 112 calculates target driving power DP_T. The target driving power DP_T is target driving power for the constant speed running control, and is calculated based on the vehicle speed VSP and the target vehicle speed VSP_T as driving power for setting the vehicle speed VSP to the target vehicle speed VSP_T by the control, that is, driving power for achieving a constant speed running state.

The calculated target driving power DP_T is input to the target gear position calculation unit 113, the target engine torque calculation unit 114, and the target accelerator position calculation unit 115.

The target gear position calculation unit 113 calculates a target gear position GP_T. The target gear position GP_T is a gear position for converging the vehicle speed VSP to the target vehicle speed VSP_T while the vehicle running downhill. When the vehicle is accelerating and the vehicle speed VSP is equal to or higher than the start vehicle speed VSP1 (target vehicle speed VSP_T+α) of the vehicle speed convergence control, the target gear position GP_T is set to the gear position GP on a lower speed position side than the current gear position GP, and when the vehicle is decelerating and the vehicle speed VSP is equal to or lower than a lower limit value VSP2 of the target vehicle speed (target vehicle speed VSP_T−β) of the constant speed running control, the target gear position GP_T is set to the gear position GP on a higher speed position side than the current gear position GP.

In the present embodiment, the target gear position GP_T is set to a gear position GP adjacent to the current gear position GP. Therefore, when the vehicle is accelerating and the vehicle speed VSP is equal to or higher than the start vehicle speed VSP1 of the vehicle speed convergence control, the target gear position GP_T is set to a gear position GP adjacent to the current gear position GP from the lower speed position side, in other words, a gear position GP adjacent to the current gear position GP in a downshift direction. The current gear position GP can be comprehended based on the gear position GP input from the transmission controller 12.

The target gear position GP_T is updated based on an update condition of the target gear position GP_T. Calculating the target gear position GP_T includes updating the target gear position GP_T. When the vehicle is accelerating, the update condition of the target gear position GP_T includes that the acceleration/deceleration G is larger than a determination value G1, and that the vehicle speed VSP is equal to or higher than the start vehicle speed VSP1 of the vehicle speed convergence control.

The determination value G1 is an acceleration determination value and is used to permit the update of the target gear position GP_T. The determination value G1 will be further described later. The downshift which is added based on the update of the target gear position GP_T is required when the vehicle speed VSP is equal to or higher than the start vehicle speed VSP1 of the vehicle speed convergence control and the acceleration/deceleration G is larger than the determination value G1.

As can be seen from the update conditions, the target gear position GP_T is updated in accordance with the acceleration/deceleration G and the vehicle speed VSP. An acceleration/deceleration G after the completion of the gear shift is used as the acceleration/deceleration G. The acceleration/deceleration G after the completion of the gear shift is the acceleration/deceleration G corresponding to the gear position GP after the gear shift, and is the acceleration/deceleration G after the transient change during the gear shift.

The update conditions of the target gear position GP_T when the vehicle is accelerating further include that a state in which the acceleration/deceleration G is larger than the determination value G1 continues for a predetermined time. When the state in which the acceleration/deceleration G is larger than the determination value G1 continues for the predetermined time, it is determined to update the target gear position GP_T, and the target gear position GP_T is actually updated.

The target gear position GP_T when the vehicle is accelerating is set to a gear position GP which is one gear lower than the current gear position GP by updating. At the gear position GP based on the updated target gear position GP_T, the vehicle is decelerated by downshifting to the gear position GP. As a result, the acceleration/deceleration G (acceleration) of the vehicle decreases, and the increase in the vehicle speed VSP is reduced, so that the vehicle speed VSP is converged to the target vehicle speed VSP_T.

The determination value G1 is set for each of the gear positions that can be downshifted during the constant speed running control. As described above, in the present embodiment, the downshift is performed between the adjacent gear positions during the constant speed running control, and thus the determination value G1 is set for each of the adjacent gear positions. The determination value G1 is set in accordance with a difference in the gear ratio between the adjacent gear positions. The determination value G1 is set to be large when the difference in the gear ratio between the gear positions is relatively large among the gear positions that can be downshifted during the constant speed running control.

Figure 3:
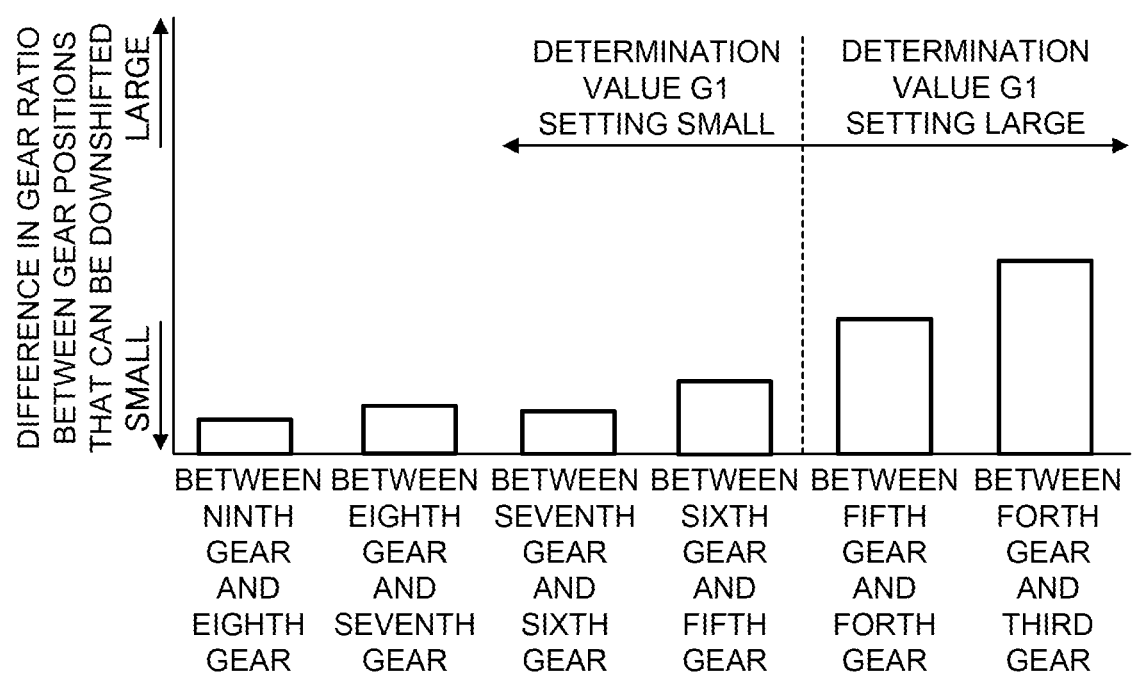
FIG. 3 is a diagram showing gear ratios between adjacent gear positions.

FIG. 3 is a diagram showing the difference in the gear ratio between adjacent gear positions that can be downshifted during the constant speed running control. As shown in FIG. 3, in the constant speed running control according to the present embodiment, a downshift can be performed between adjacent gear positions from a ninth gear to a third gear. Further, as shown in FIG. 3, in the automatic transmission 2, a difference in the gear ratio between a fifth gear and a fourth gear and a difference in the gear ratio between the fourth gear and the third gear are larger than a difference in the gear ratio between the ninth gear and the eighth gear, a difference in the gear ratio between an eighth gear and a seventh gear, a difference in the gear ratio between the seventh gear and a sixth gear, and a difference in the gear ratio between the sixth gear and the fifth gear. That is, in the automatic transmission 2, the difference in the gear ratio between the gear positions on the lower speed position side is larger than the difference in the gear ratio between the gear positions on the higher speed position side. Accordingly, the determination value G1 between the fifth gear and the fourth gear and the determination value G1 between the fourth gear and the third gear are set to be larger than the determination value G1 between the ninth gear and the eighth gear, the determination value G1 between the eighth gear and the seventh gear, the determination value G1 between the seventh gear and the sixth gear, and the determination value G1 between the sixth gear and the fifth gear.

As a result, the acceleration/deceleration G is less likely to exceed the determination value G1 on the lower speed position side where the difference in the gear ratio between the gear positions is large. The controller 100 is configured to have the setting of the determination value G1 like this.

The determination of the update of the target gear position GP_T when the vehicle is accelerating is performed when the state in which the acceleration/deceleration G is larger than the determination value G1 continues for the predetermined time as described above. The determination value G1 is set in accordance with the difference in the gear ratio between the gear positions as described above. Therefore, the determination of the update of the target gear position GP_T when the vehicle is accelerating is performed in accordance with the acceleration/deceleration G and the difference in the gear ratio between the gear positions.

The determination of the update of the target gear position GP_T when the vehicle is decelerating is performed when a state in which the acceleration/deceleration G is lower than the determination value G1 continues for a predetermined time. The determination value G1 in this case can be set to be a small value.

The target gear position calculation unit 113 calculates the target gear position GP_T to set the target gear position GP_T. The calculated target gear position GP_T is input to the gear position limiting unit 123.

The target engine torque calculation unit 114 calculates a target engine torque. The target engine torque is an engine torque for achieving the target vehicle speed VSP_T, and is calculated based on the target driving power DP_T.

The target accelerator position calculation unit 115 calculates a target accelerator position APO_T. The target accelerator position APO_T is a target accelerator position for achieving the constant speed running, and is calculated based on the target driving power DP_T and the vehicle speed VSP. The target accelerator position APO_T is predetermined by map data corresponding to the target driving power DP_T and the vehicle speed VSP.

The towing determination unit 121 determines whether the vehicle is in a towing state based on a signal from a towing sensor. The determination result whether the vehicle is in the towing state is input to the gear shift line switching unit 122.

The gear shift line switching unit 122 calculates the gear position GP corresponding to the target accelerator position APO_T input from the target accelerator position calculation unit 115 and the vehicle speed VSP. The gear position GP corresponding to the target accelerator position APO_T and the vehicle speed VSP is set in advance by the map data of the gear shift line. The map data of the gear shift line is set in advance in accordance with the presence or absence of the towing, and the gear shift line switching unit 122 switches the map data of the gear shift line in accordance with the presence or absence of the towing.

The gear shift line switching unit 122 further calculates a map gear position GP_M, which is a gear position GP based on the map data of the gear shift line. The calculated map gear position GP_M is input to the gear position limiting unit 123.

The gear position limiting unit 123 determines the gear position GP based on the target gear position GP_T and the map gear position GP_M. The gear position limiting unit 123 selects the gear position GP on the lower speed position side from the target gear position GP_T and the map gear position GP_M, in order to limit the gear position GP to the gear position GP on the lower speed position side from the target gear position GP_T and the map gear position GP_M.

Since the gear position GP before the start of the vehicle speed convergence control is determined based on the map data of the gear shift line, the target gear position GP_T, which is set to the gear position GP lower by one gear than the current gear position GP, becomes the gear position GP on the lower speed position side than the map gear position GP_M. The gear position GP determined by the gear position limiting unit 123 is output as a gear shift instruction, and is input to the target gear position calculation unit 113 as the current gear position GP.

Immediately after the gear position GP is determined by the gear position limiting unit 123, the gear shift has not been completed in response to the gear shift instruction, and the gear shift to the instructed gear position GP is completed after the gear shift period. Therefore, the target gear position calculation unit 113 does not update the target gear position GP_T during the gear shift, but updates the target gear position GP_T after the gear shift is completed. Therefore, the update condition of the target gear position GP_T further includes the completion of the gear shift.

In order to update the target gear position GP_T in this way, the target gear position calculation unit 113 can be configured to calculate the target gear position GP_T after a preset gear shift period since a gear position GP different from the previously input gear position GP is input from the gear position limiting unit 123. Thus, as described above, the target gear position GP_T can be updated in accordance with the acceleration/deceleration G and the vehicle speed VSP after the completion of the gear shift.

Next, the constant speed running control performed by the controller 100 will be described with reference to FIG. 4.

Figure 4:
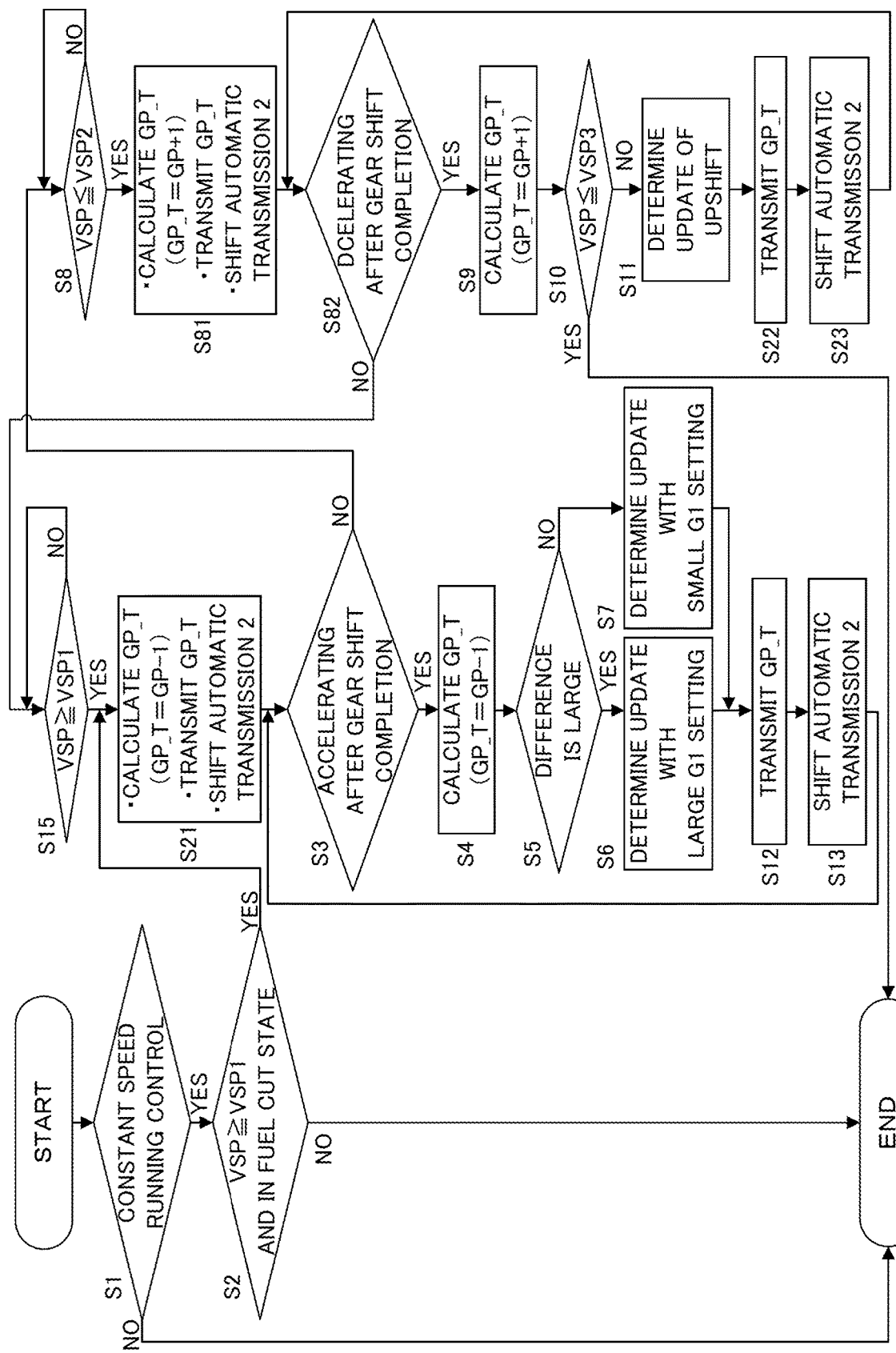
FIG. 4 is a flowchart showing an example of a constant speed running control performed by the controller.

FIG. 4 is a flowchart showing a first example of the constant speed running control performed by the controller 100. In FIG. 4, processes of steps S13 and S23 are performed by the transmission controller 12, and other processes except the processes of steps S13 and S23 are performed by the engine controller 11. The controller 100 is programmed for executing the processes shown in the present flowchart, and thus has a control unit that performs various types of controls shown in the present flowchart. The controller 100 can repeatedly execute the processes of this flowchart.

In step S1, the controller 100 determines whether the constant speed running control is being performed. Whether the constant speed running control is being performed can be determined based on, for example, a flag indicating whether the constant speed running control is being performed. If a negative determination is made in step S1, the process ends temporarily. If an affirmative determination is made in step S1, the process proceeds to step S2.

In step S2, the controller 100 determines whether the vehicle speed VSP is equal to or higher than the start vehicle speed VSP1 of the vehicle speed convergence control and whether the vehicle is in a fuel cut state. The former can be determined based on, for example, the target vehicle speed VSP_T of the constant speed running control and the signal from the vehicle speed sensor, and the latter can be determined based on, for example, a flag indicating whether the vehicle is in the fuel cut state. By making these determinations, it is determined whether the vehicle is running downhill during the constant speed running control. If a negative determination is made in step S2, it is determined that the vehicle is not running downhill during the constant speed running, and the process ends temporarily. If an affirmative determination is made in step S2, the process proceeds to step S21.

In step S21, the controller 100 calculates the target gear position GP_T of the downshift. The target gear position GP_T is calculated from the current gear position GP to a gear position GP that is one gear lower than the current gear position GP. Further, in step S21, the target gear position GP_T is transmitted to the transmission controller 12, and the transmission controller 12 shifts the automatic transmission 2. Accordingly, the current gear position GP is set to the target gear position GP_T by the control, and the downshift is performed.

In step S3, the controller 100 determines whether the vehicle is accelerating after the completion of the gear shift. Whether the gear shift is completed can be determined based on whether the gear shift period has elapsed. If an affirmative determination is made in step S3, it is determined that the deceleration by the gear position GP after the gear shift is insufficient. In this case, the process proceeds to step S4. If a negative determination is made in step S3, the process proceeds to step S8.

In step S4, the controller 100 calculates the target gear position GP_T of the downshift. The target gear position GP_T is calculated from the current gear position GP to a gear position GP that is one gear lower than the current gear position GP.

In step S5, the controller 100 determines whether the difference in the gear ratio between the current gear position GP and the target gear position GP_T is relatively large among the gear positions that can be downshifted during the constant speed running control (that is, whether the current speed position GP and the target gear position GP_T are the fifth gear and the fourth speed or are the fourth gear and the third gear). If an affirmative determination is made in step S5, it is determined that if the determination of updating the target gear position GP_T is made with the determination value G1 in that case, a sudden deceleration due to the downshift will occur. In this case, the process proceeds to step S6.

In step S6, the controller 100 determines the update of the target gear position GP_T while setting the determination value G1 to a large value. This makes it difficult for the acceleration/deceleration G to become larger than the determination value G1, and makes it difficult to update the target gear position GP_T.

In the case where a negative determination is made in step S5, it is determined that the sudden deceleration due to the downshift does not occur even though the determination of updating the target gear position GP_T is made with the determination value G1 in that case. In this case, the process proceeds to step S7.

In step S7, the controller 100 determines the update of the target gear position GP_T while keeping the setting of the determination value G1 small. Thus, when the sudden deceleration due to the downshift does not occur, it is possible to promote the update of the target gear position GP_T to promote the downshift. After step S7, the process proceeds to step S12. The same applies after step S6.

In step S12, the target gear position GP_T is transmitted to the transmission controller 12. In step S12, when it is determined in step S6 or step S7 that the target gear position GP_T is to be updated, the target gear position GP_T calculated in step S4 is transmitted to the transmission controller 12.

In step S13, the controller 100 shifts the automatic transmission 2. Accordingly, the current gear position GP is set to the target gear position GP_T by the control. Therefore, in the case of the target gear position GP_T of the downshift, the downshift is performed. After step S13, the process returns to step S3. That is, if an affirmative determination is made in step S3, the downshift is repeatedly performed by repeating the same process. If it is determined in step S3 that the vehicle does not accelerate after the completion of the gear shift, the vehicle is decelerating after the completion of the gear shift, and the process proceeds to step S8.

In step S8, the controller 100 determines whether the vehicle speed VSP is equal to or lower than the lower limit value VSP2 of the target vehicle speed. If a negative determination is made in step S8, the process returns to step S8. If an affirmative determination is made in step S8, the process proceeds to step S81.

In step S81, the controller 100 calculates the target gear position GP_T of the upshift. The target gear position GP_T is calculated from the current gear position GP to a gear position GP that is one gear higher than the current gear position GP. Further, in step S81, the target gear position GP_T is transmitted to the transmission controller 12, and the transmission controller 12 shifts the automatic transmission 2. Accordingly, the current gear position GP is set to the target gear position GP_T by the control, and the upshift is performed.

In step S82, the controller 100 determines whether the vehicle is decelerating after the completion of the gear shift. Whether the gear shift is completed can be determined based on whether the gear shift period has elapsed. If an affirmative determination is made in step S82, the process proceeds to step S9, and if a negative determination is made, the process proceeds to step S15.

In step S9, the controller 100 calculates the target gear position GP_T of the upshift. The target gear position GP_T is calculated from the current gear position GP to a gear position GP that is one gear higher than the current gear position GP.

In step S10, the controller 100 determines whether the vehicle speed VSP is equal to or lower than a cancellation vehicle speed VSP3. The cancellation vehicle speed VSP3 is a cancellation vehicle speed of the vehicle speed convergence control and is preset. When the downhill running is finished, the vehicle speed VSP becomes equal to or lower than the cancellation vehicle speed VSP3 due to a decrease in the vehicle speed VSP even when the upshift is performed. If an affirmative determination is made in step S10, the vehicle speed convergence control is cancelled, and the process ends temporarily. If a negative determination is made in step S10, the process proceeds to step S11.

In step S11, the controller 100 determines the update of the target gear position GP_T of the upshift. In step S11, as described above, it is determined that the target gear position GP_T is updated when the state in which the acceleration/deceleration G is lower than the determination value G1 continues for the predetermined time. After step S11, the process of step S22 (transmission of the target gear position GP_T to the transmission controller 12) and further the process of step S23 (gear shift of the automatic transmission 2 by the transmission controller 12) are performed, thereby performing the upshift. After step S23, the process returns to step S82.

If an affirmative determination is made in step S82, the upshift is repeatedly performed by repeating the same process. In step S82, the affirmative determination is repeatedly made until a running resistance is reaching a road load, and the upshift is repeatedly performed accordingly. If an affirmative determination is made in step S10 in that case, the vehicle speed convergence control is cancelled. If it is determined in step S82 that the vehicle does not decelerate after the completion of the gear shift, the vehicle is accelerating after the completion of the gear shift, and the process proceeds to step S15.

In step S15, the controller 100 determines whether the vehicle speed VSP is equal to or higher than the start vehicle speed VSP1 of the vehicle speed convergence control. If a negative determination is made in step S15, the process returns to step S15. If an affirmative determination is made in step S15, the process proceeds to step S21 and subsequent steps, and a downshift is performed.

Figure 5:
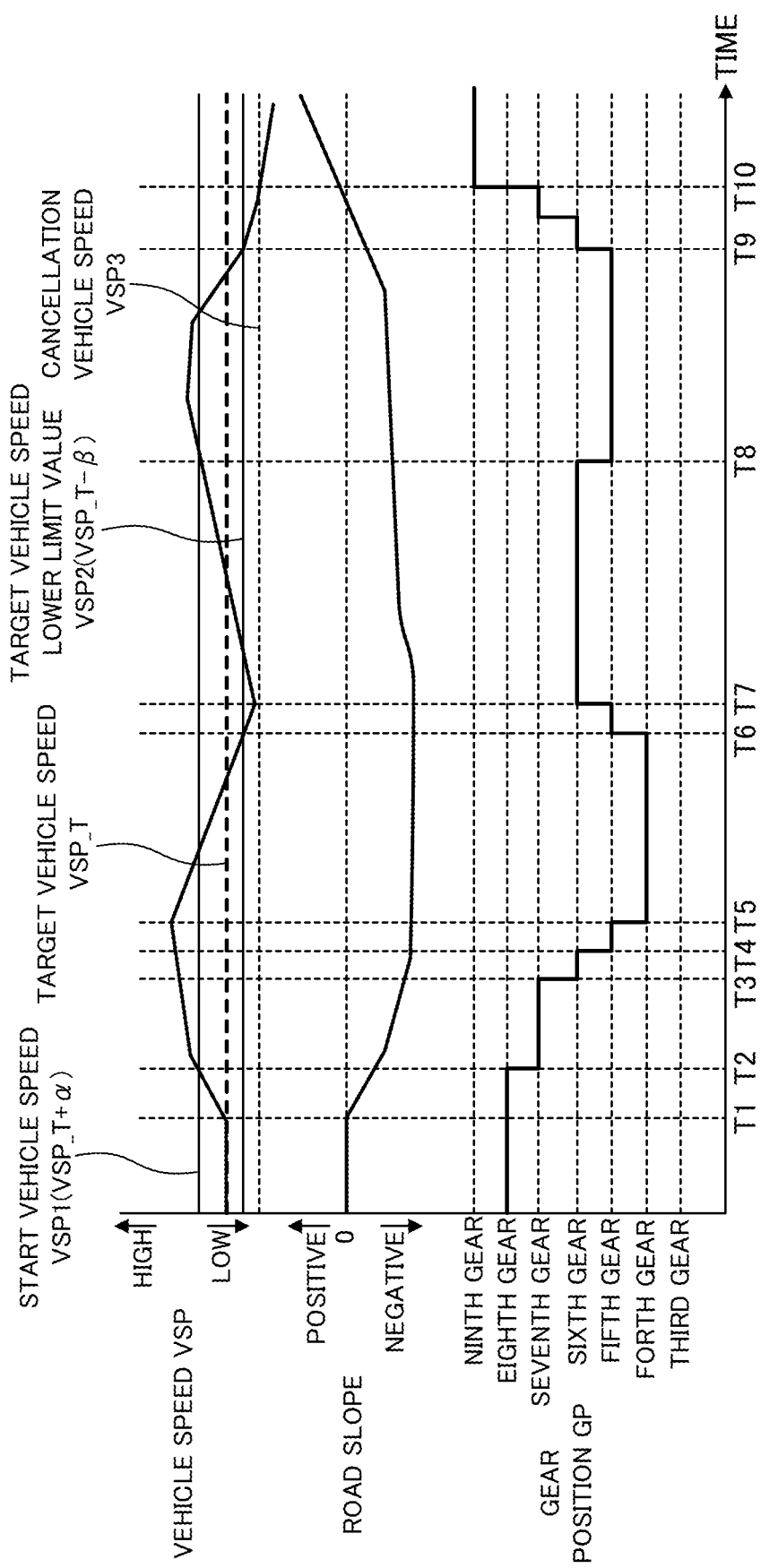
FIG. 5 is a diagram showing a first example of a timing chart corresponding to the flowchart.

FIG. 5 is a diagram showing a first example of a timing chart corresponding to the flowchart of FIG. 4. Before timing T1, the constant speed running control is performed on a flat road. At timing T1, the vehicle begins to run downhill and a road slope becomes negative. As a result, the vehicle speed VSP starts to increase.

At timing T2, the vehicle speed VSP reaches the start vehicle speed VSP1 of the vehicle speed convergence control in the fuel cut state. Therefore, the downshift is started, and the gear position GP is downshifted by one gear.

At timing T3, it becomes that the state in which the acceleration/deceleration G is larger than the determination value G1 continues for the predetermined time or more, and the vehicle speed VSP is the start vehicle speed VSP1 or higher of the vehicle speed convergence control. Therefore, at the timing T3, an additional downshift is performed. The determination value G1 at the timing T3 is set to a small value because of the downshift between the seventh gear and the sixth gear.

At timing T4, when the vehicle speed VSP is the start vehicle speed VSP1 or higher of the vehicle speed convergence control, the state in which the acceleration/deceleration G is larger than the determination value G1 from the timing T3 continues for the predetermined time or more. Therefore, at the timing T4, an additional downshift is further performed. The same applies to timing T5. The determination value G1 at the timing T4 is set to be small for the downshift between the sixth and fifth gears, and the determination value G1 at the timing T5 is set to be large for the downshift between the fifth and fourth gears.

From the timing T5, the vehicle starts to decelerate due to the downshift, and the vehicle speed VSP decreases. Therefore, from the timing T5, the gear shift performed by the vehicle speed convergence control shifts from the downshift to the upshift. Then, at timing T6, the vehicle speed VSP falls below the lower limit value VSP2 of the target vehicle speed, and as a result, the upshift is started.

At timing T7, the state in which the acceleration/deceleration G is lower than the determination value G1 continues for the predetermined time from the timing T6 in the state in which the vehicle speed VSP is lower than the lower limit value VSP2 of the target vehicle speed. Therefore, an additional upshift is performed.

From the timing T7, the vehicle starts to accelerate due to the upshift, and the vehicle speed VSP increases. Therefore, from the timing T7, the shift performed by the vehicle speed convergence control shifts from the upshift to the downshift. Then, when the vehicle speed VSP reaches the start vehicle speed VSP1 at timing T8, the downshift is restarted.

From the timing T8, the difference in the gear ratio between the current gear position GP and the target gear position GP_T becomes relatively large among the gear positions that can be downshifted during the constant speed running control. That is, in this example, the difference in the gear ratio between the fifth gear and the fourth gear is relatively large between adjacent gear positions from the ninth gear to the third gear. Therefore, the determination value G1 increases from the timing T8. As a result, the acceleration/deceleration G is less likely to exceed the determination value G1, and an additional downshift is less likely to be performed. Therefore, the gear position GP is maintained at the fifth gear.

At timing T9, the vehicle speed VSP falls below the lower limit value VSP2 of the target vehicle speed. As a result, the upshift is performed. Thereafter, the vehicle speed convergence control is cancelled when the vehicle speed VSP becomes equal to or less than the cancellation vehicle speed VSP3 due to the decrease in the vehicle speed VSP in combination with the fact that the vehicle goes uphill after the additional downshift is performed (timing T10).

Figure 6:
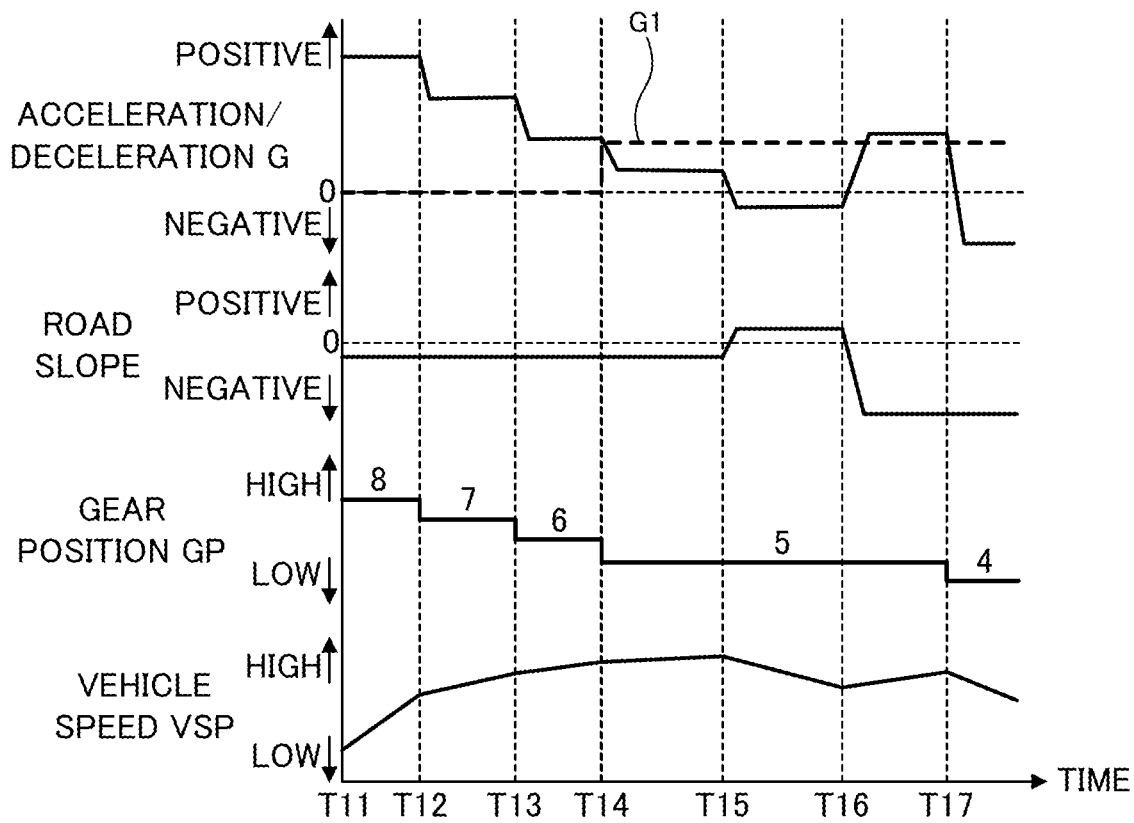
FIG. 6 is a diagram showing a second example of the timing chart corresponding to the flowchart.

FIG. 6 is a diagram showing a second example of the timing chart corresponding to the flowchart shown in FIG. 4. In the second example, an additional downshift is repeatedly performed by the vehicle speed convergence control during the constant speed running control.

From timing T11 to timing T15, the road slope is negative. Therefore, the acceleration/deceleration G is positive, and the vehicle speed VSP increases.

From the timing T11 to timing T14, the determination value G1 is set to zero, and the acceleration/deceleration G is larger than the determination value G1. The vehicle speed VSP is higher than the start vehicle speed VSP1 of the vehicle speed convergence control. Therefore, when this state continues for the predetermined time, the downshift is performed at timing T12, timing T13, and the timing T14, respectively. As a result, each time the downshift is performed, the gear position GP is changed to the gear position GP that is one gear lower in speed, and the gear is changed from the eighth gear to the fifth gear. Further, the acceleration/deceleration G decreases each time the downshift is performed, and the increase in the vehicle speed VSP also becomes gentle. The acceleration/deceleration G transiently changes during the gear shift, and becomes a value corresponding to the gear position GP after the completion of the gear shift.

The difference in the gear ratio between the fifth gear and the fourth gear is relatively large among the gear positions that can be downshifted during the constant speed running control. Therefore, when the gear position GP becomes the fifth gear, the setting of the determination value G1 is switched to setting of large value (for example, 0.02 G). As a result, the acceleration/deceleration G becomes lower than the determination value G1, and the downshift is not performed even when the predetermined time elapses.

At the timing T15, the road slope starts to increase, and becomes positive immediately after the timing T15. Therefore, the acceleration/deceleration G also starts to decrease from the timing T15, and becomes negative immediately after the timing T15. As a result, the vehicle speed VSP starts to decrease from the timing T15.

At timing T16, the road slope starts to decrease, and becomes negative immediately after the timing T16. Therefore, the acceleration/deceleration G also starts to increase from the timing T16, and becomes positive immediately after the timing T16. In that case, the acceleration/deceleration G becomes larger than the determination value G1. The vehicle speed VSP starts to increase from the timing T16.

At timing T17, the state in which the acceleration/deceleration G is larger than the determination value G1 continues for a predetermined time, and thus the downshift is performed. As a result, the gear position GP is changed from the fifth gear to the fourth gear.

When the determination value G1 is not set large, the downshift of the gear position GP from the fifth gear to the fourth gear is performed between the timing T14 and the timing T15. In this case, in combination with the fact that the running resistance is near the road load, the acceleration/deceleration G greatly decreases and becomes negative, and the upshift is performed in a short time after the downshift. That is, the busy shift occurs.

In the case of the present embodiment, the gear position GP is maintained at the fifth gear during the period from the timing T14 to the timing T17, which does not cause the upshift in a short time. In the case of the present embodiment, the downshift to the fourth gear is performed for the first time when the downward slope becomes large immediately after the timing T16 and it is necessary to decelerate.

Next, the main operation and effect of the present embodiment will be described.

The control method for a constant speed running of a vehicle according to the present embodiment performs a vehicle speed control for downshifting the gear position GP of the automatic transmission when the acceleration/deceleration G of the vehicle is larger than the determination value G1 during the constant speed running control. In the control method for the constant speed running of the vehicle, the automatic transmission includes a plurality of gear positions that can be downshifted during the constant speed running control, and among the plurality of gear positions, the determination value G1 between the gear positions having a relatively large difference in the gear ratio between the gear positions is set to be larger than the determination value G1 between the gear positions having a relatively small difference in the gear ratio between the gear positions.

According to such a method, it is possible to prevent the downshift that causes the upshift in a short time from being performed during the vehicle speed convergence control. Therefore, according to such a method, it is possible to suppress the busy shift during the constant speed running control.

The control method for the constant speed running of the vehicle according to the present embodiment further includes downshifting the gear position of the automatic transmission when the vehicle speed VSP is higher than the target vehicle speed VSP_T of the constant speed running control by a predetermined vehicle speed a or higher.

According to such a method, it is possible to appropriately determine the necessity of the downshift, and thus it is possible to appropriately suppress the busy shift.

In the control method for constant speed running of a vehicle according to the present embodiment, the gear positions that can be downshifted during the constant speed running control are adjacent gear positions.

According to such a method, it is possible to prevent the downshift that causes the upshift in a short time from being performed during the vehicle speed convergence control.

In the control method for constant speed running of a vehicle according to the present embodiment, the difference in the gear ratio between adjacent gear positions is larger between the gear positions on the lower speed position side than between the gear positions on the higher speed position side.

According to such a method, by increasing the determination value G1 on the lower speed position side as described above, it is possible to make it difficult to downshift on the lower speed position side, and thus it is possible to prevent the busy shift from occurring on the lower speed position side.

Although the embodiment of the present invention has been described above, the above-mentioned embodiment is only a part of application examples of the present invention, and does not mean that the technical scope of the present invention is limited to a specific configurations of the above-mentioned embodiment.

For example, not only the adjacent gear positions but also every two or more gear positions can be downshifted during the constant speed running control. Even in this case, it is possible to suppress the busy shift by preventing the downshift that causes the upshift in a short time.

In the above-described embodiment, the case where the setting of the determination value G1 is changed in accordance with a determination result of the difference in the gear ratio has been described. However, the determination value G1 may be preset in a state of being divided into the lower speed position side and the higher speed position side.

In the above-described embodiment, a case in which the control method for constant speed running of a vehicle and the control device for constant speed running of a vehicle are implemented by the controller 100 has been described. However, the control method for constant speed running of a vehicle and the control device for constant speed running of a vehicle may be implemented by a single controller, for example.

The invention claimed is:

1. A control method for a constant speed running of a vehicle that performs a vehicle speed control by downshifting a gear position of an automatic transmission in a case where an acceleration/deceleration of the vehicle is larger than a determination value during a constant speed running control, wherein
the automatic transmission includes a plurality of gear positions that is capable of being downshifted during the constant speed running control, and among the plurality of gear positions, a determination value between gear positions having a relatively large difference in a gear ratio between the gear positions is set to be larger than a determination value between gear positions having a relatively small difference in the gear ratio between the gear positions.

2. The control method for the constant speed running of the vehicle according to claim 1, wherein
the constant speed running control method further comprises downshifting the gear position of the automatic transmission in a case where a vehicle speed is higher than a target vehicle speed of the constant speed running control by a predetermined vehicle speed or higher.

3. The control method for the constant speed running of the vehicle according to claim 1, wherein the gear positions that are capable of being downshifted during the constant speed running control are adjacent gear positions.

4. The control method for the constant speed running of the vehicle according to claim 3, wherein
a difference in the gear ratio between the adjacent gear positions is larger between gear positions on a lower speed position side than between gear positions on a higher speed position side.

5. A control device for a constant speed running of a vehicle that performs a vehicle speed control by downshifting a gear position of an automatic transmission in a case where an acceleration/deceleration of the vehicle is larger than a determination value during a constant speed running control, wherein
the automatic transmission includes a plurality of gear positions that is capable of being downshifted during the constant speed running control, and
among the plurality of gear positions, a determination value between gear positions having a relatively large difference in a gear ratio between the gear positions is set to be larger than a determination value between gear positions having a relatively small difference in the gear ratio between the gear positions.

* * * * *